April 15, 1930.  A. G. BERGMAN  1,754,977
VERTICAL RISING AIRPLANE
Filed July 13, 1925   2 Sheets-Sheet 2
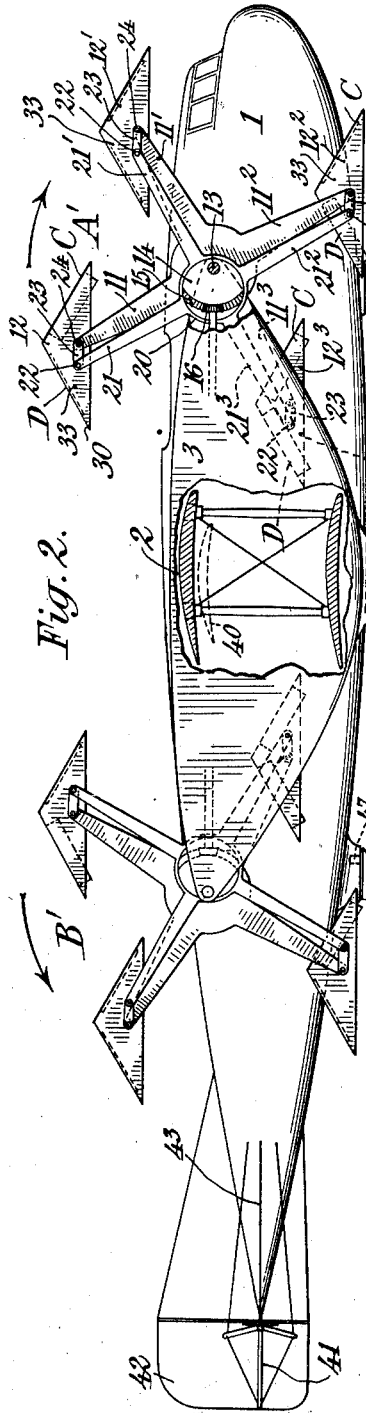
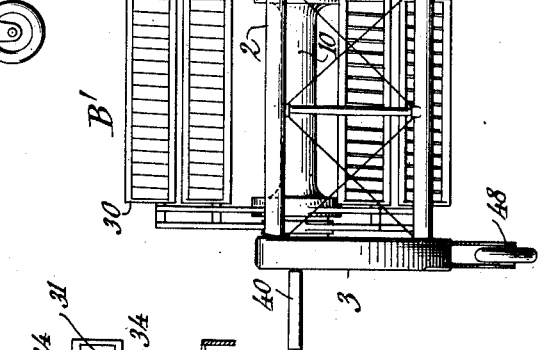
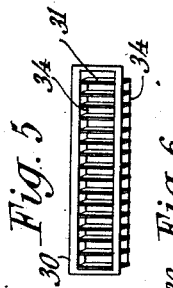
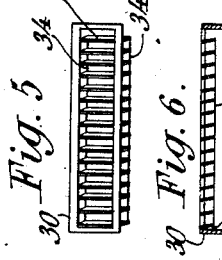
INVENTOR
Axel G. Bergman,
By Attorneys, Patented Apr. 15, 1930

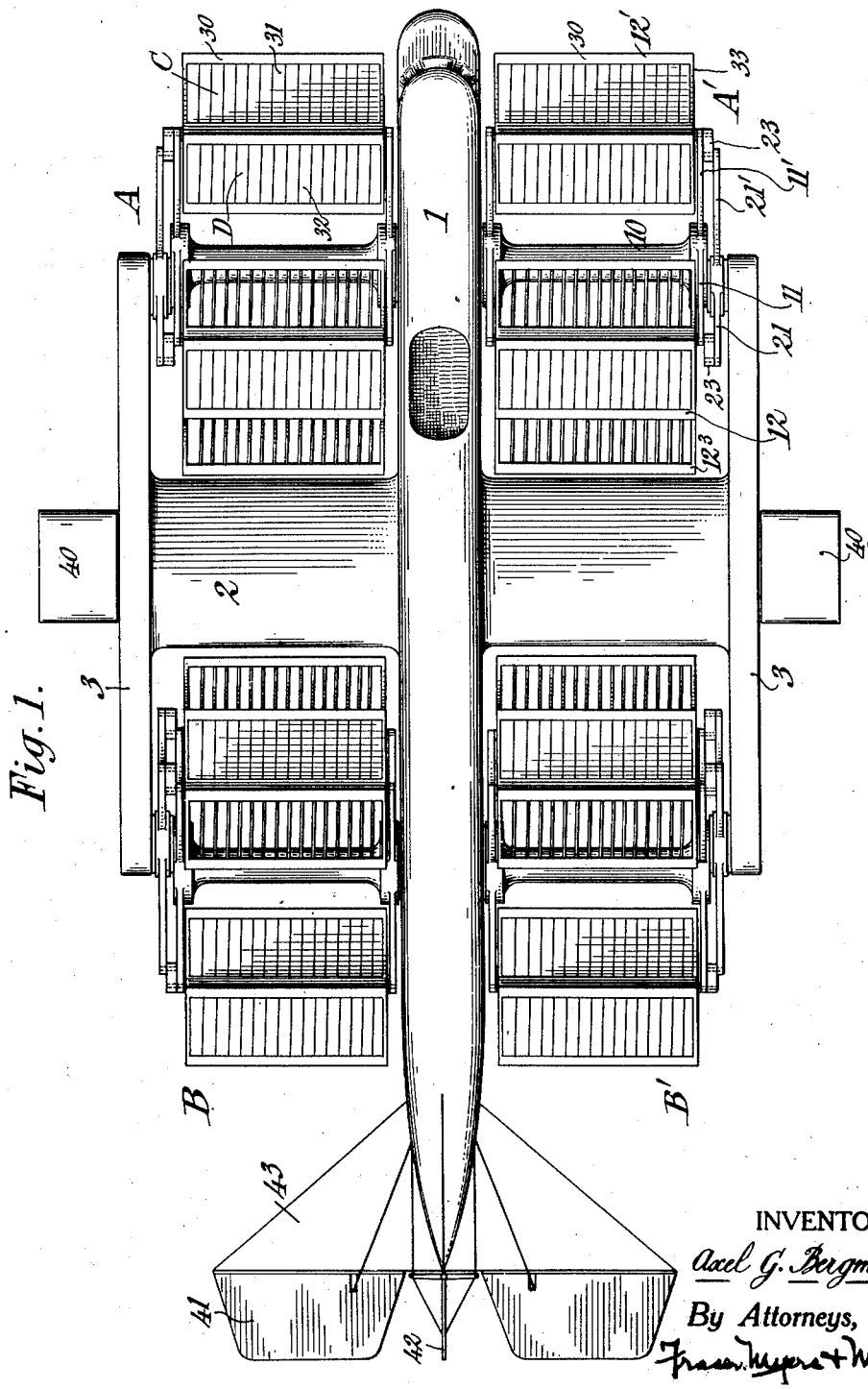

1,754,977

UNITED STATES PATENT OFFICE

AXEL G. BERGMAN, OF NEW YORK, N. Y.

VERTICAL-RISING AIRPLANE

Application filed July 13, 1925. Serial No. 43,294.

This invention relates to an airplane having the capacity to rise vertically and to traverse through the air horizontally at will. The primary object of this invention is to provide an aircraft combining the advantages of the helicopter with those of the airplane.

The invention provides an improved application of the feathering blade paddle wheel type of propeller to vertical rising aircraft whereby the torques of such wheels are balanced one against another, so that there is no resultant tendency whatever to rotate the machine about the axes of such wheels, and at the same time having the wheels disposed with their rotational axes transverse to the line of flight of the machine whereby the horizontal components of thrust may be utilized to propel the machine horizontally.

A further object of the invention is to provide an improved propelling means for driving aircraft and the like in any desired direction. The invention further provides improved means for stabilizing vertical rising airplanes at times when the forward speed of the machine would be insufficient to render the ordinary controls, such as are applied to the standard heavier-than-air machine today effective for the purpose of obtaining longitudinal and lateral stability.

According to the present invention there is provided an aircraft of the heavier-than-air type, having the capacity to rise vertically from the ground without any running take-off whatever and to descend vertically in still air upon a given ground space and without detrimental shock to the machine. The machine is capable of horizontal flight at a chosen elevation at speeds considerably in excess of the velocity of any of the impeller parts, and its course, and lateral and longitudinal stability are at all times under the control of the pilot, regardless of whether the motors are running or at a standstill. A vertical rising airplane according to this invention is provided, by virtue of the design and arrangement of the propelling surface and certain auxiliary sustaining areas, with sufficient lifting surface to permit it to glide or volplane safely to the ground without the application of any power whatsoever to the propelling means. According to one design for a man-carrying machine of the type now being described, the total load on the sustaining surface which would be active in gliding flight is less than six pounds per square foot. This is well within the safe loading for gliding at ordinary landing speeds. When the machine is in full horizontal flight the ordinary aileron, rudder, and stabilizer surfaces may be employed to control its course. Until normal horizontal flying speed has been attained means are provided for independently controlling the efficiency of the several impeller devices, whereby through increasing the lifting efficiency of one or more or decreasing the efficiency of others the machine may be kept on an even keel.

Referring to the drawings,—

Figure 1 shows a plan view of one form of heavier-than-air machine according to the present invention.

Fig. 2 is a side elevation partly in section of the same machine.

Fig. 3 is a front elevation of the assembled machine according to Figs. 1 and 2, the forward left-hand rotary impeller being removed to show the rear left-hand impeller.

Fig. 4 shows in side elevation one of the wheel propelling devices and illustrates various adjustments of the blade feathering device.

Fig. 5 shows in detail a plan view of a modified form of surface element of an impeller blade.

Fig. 6 is a cross section of the impeller blade shown in Fig. 5.

Fig. 7 shows a further modification of one of the propelling surfaces divided into three shutter sections.

The invention according to the preferred embodiment illustrated in the drawings comprises a body portion or fuselage 1 upon which are mounted a plurality of feathering blade impellers preferably four in number, and arranged in fore and aft pairs, the right and left-hand forward impellers as viewed from the front of the machine being designated as A A' and the corresponding impellers in the rear being B B' respectively. The transverse supporting frame 2 is rigidly attached to the central body 1 and at its outward extremities carries longitudinal truss members 3 at the forward and rear ends of which are provided suitable mountings for the outward bearings of the several rotary impellers, as shown. The transverse frame 2 is preferably of the wire braced truss construction similar to that employed in the usual biplane, and its upper and lower portions may be formed externally in accordance with standard wing construction, the top and bottom surfaces of each wing being cambered in accordance with proper wing design for the speed at which the machine is intended to fly. The machine is provided with suitable landing gear as shown, which will be hereinafter more fully described.

The principal sustaining means and preferably the sole propelling surfaces are comprised by the blades or active pressure surfaces of the rotary impellers A A' and B B'. One of these impellers will now be described in detail, it being understood that each of the others is preferably of the same identical construction with the exception that the impeller on the opposite side of the machine from the one now to be described will be a right hand duplicate, since the present one will be the left-hand forward impeller A.

According to the preferred embodiment illustrated in the drawings, the impeller is constructed as follows:

Power is applied to the impeller A at its central axis and at a point adjacent the fuselage, said axis comprising a relatively large tubular shaft 10, as this shaft is required to transmit quite heavy torque. It is made preferably in hollow cylindrical form, as this affords a greater rigidity against deformation through twisting stresses than a solid shaft of the same weight. At either end of the driving tube 10 are blade-supporting arms 11, 11', 11², 11³, preferably 90° apart, the corresponding arms at either end of the tube being parallel. At their inner portions these arms are rigidly attached to the torque tube 10 and at their outer ends are provided with bearings suitable for the pivotal support of the impeller blades 12, 12', 12², 12³. A bearing shaft 13 extends from the outer portion of the impeller A and is suitably journaled in a bearing supported by the longitudinal truss member 3. Pivotally mounted on said shaft and inwards of the longitudinal truss member is an eccentric 14 on the face of which may be cut an arc of gear teeth 15, having the axis 13 as a center. A control shaft and pinion 16 is rotatably mounted on the truss member 3, the pinion meshing with teeth 15, whereby the position of the eccentric 14 may be regulated and fixed in any desired relationship with the shaft 13. Surrounding the eccentric 14 is an eccentric band 20 at the four quadrants of which are blade feathering arms 21, 21', 21², 21³. These arms are rigidly attached to the eccentric band and at their outer extremities are provided with studs or bosses 22. The bosses 22 form a pivotal connection with crank arms 23, which arms are rigidly attached to shafts 24 passing through the bearing in the outer ends of arms 11, 11', 11² and 11³. To each shaft is fixed respectively the impeller blades 12, 12', 12² and 12³.

By virtue of the arrangement of the impeller arms 11, 11', 11² and 11³ and the feathering control arms 21, 21¹, 21² and 21³, the effective center of the feathering control eccentric 14 being disposed at a distance from the center 13 equivalent to the length of the crank arm 23 and the line of said centers being parallel to said crank arm, there is provided a parallel motion device, whereby the crank arms 23 and consequently the impeller blades rigidly connected therewith, will be maintained parallel to a predetermined plane throughout their entire revolution about the axis 13. The plane with respect to which all the blades will be parallel may be varied at will by shifting the eccentric 14 under the control of pinion 16, as will be more fully described hereafter.

The impeller blades will now be described in detail, reference being had to the blade 12, which, however, is typical and similar in every respect to each of the other blades on the four impellers A A' and B B'. Because of the preferred method of feathering the blades, namely, causing them to maintain positions parallel to a given plane throughout their entire rotation about the central shaft of the impeller, it is necessary to provide means for rendering the blades effective in their action against the air in directions that render them useful in producing lift or horizontal thrust and at the same time to reduce the efficiency of these surfaces to a minimum when they are traveling in directions not suited to the production of such lift or thrust. Other types of feathering may be employed whereby the blades are caused to automatically assume as a whole, varying angles of incidence suitable to the production of the desired air reactions and at times when their motions are such as to render them incapable of producing such reactions, to assume angles of approximately zero incidence, whereby the rotation of such blades through their inactive arcs of travel will absorb in such useless rotation as little power as possible. Because of the complication and various structural difficulties of obtaining such latter feathering motion as described above, the comparatively simple parallel motion type of feathering has been chosen and the blades themselves provided with automatic shutter devices which perform the function of feathering the blades at the appropriate times for the purpose of minimizing the air resistance during the inactive rotation of the blades without any mechanical control whatsoever other than the air pressure. Accordingly, in the preferred embodiment of the invention, the impeller blades, active pressure surfaces or aerofoils, as they may be termed, are constructed as follows:

As will be seen in Figure 1, the blades comprise a plurality of shutter vanes, thirty-two in number in the particular form illustrated, although the number of vanes are not material and structural considerations may dictate the use of many small vanes or a comparatively few larger ones. The blade is preferably formed as an inverted trough (see Figs. 1, 2, 3 and 5), the upper, forward and rearward surfaces C and D of which form an angle of approximately 120° between each other. The valley or long axis of the trough is furthermore, in the preferred form, at right angles to the longitudinal axis of the machine. Pivotally hung in a suitable frame 30 and forming when closed the aforesaid surfaces C, D, are rows of shutter-vanes or flaps 31 and 32 respectively, the same being adapted to swing down into a substantially vertical plane whenever there is a resulting pressure on the upper faces thereof, and to be swung into the planes of the blade surfaces C, D respectively when the resultant pressure is from the underside of the blade. As has been previously described, the crank arm 23 actuating the shaft 24, positively controls the angle of incidence of the blade 12 at all times, the shaft being rigidly secured to the frame of the blade.

One of the objects in constructing the impeller blade 12 in the form of an inverted trough is to provide a blade for striking a downward blow on the air more effectively than is possible with a flat blade; also to provide members, which, while traveling upwardly over a necessary idle arc of rotation and while the vanes 31 are open, will present inclined surfaces to the air which will offer less resistance than if they were disposed normally to their path of motion through the air. A further advantage of constructing the blade as a trough is that the rear surfaces of blades rotating in a clockwise direction, such as are the blades of impeller A', will close and become effective as lifting surfaces earlier than if they were disposed in a horizontal plane, and this will produce a condensation of air within the trough which causes the earlier closing of vanes 31 in the forward surface C of the impeller blade 12.

It will be seen in Figure 2 that the forward row of vanes comprising the surface C of impeller blade 12, are still open, while the rear blades 32 are closed. When blade 12 has reached the position now occupied by blade $12^1$, both the forward and rear shutter vanes will be closed, as shown. Continuing further in the course of a revolution, to the position now occupied by the blade $12^2$, it is seen, the rear vanes 32 will have opened under the air pressure acting downwardly through the surface D while the forward vanes 31 still remain closed by virtue of their angle of incidence and a certain condition of pressure still obtaining within the trough. When the blade reaches the position now occupied by blade $12^3$, both the forward and rear surface elements or vanes 31 and 32 respectively will have opened to the vertical position rendering the impeller surfaces C and D from that point upward to the position first described in the orbit of the blades, practically free from resistance. It will thus be seen that the impeller blades in traveling from the position illustrated for blade $12^1$ to the position of blade $12^2$ will be acting downwardly against the air with maximum efficiency, the blade throughout this arc of travel forming a perfect inverted trough, the upper surfaces of which are tightly closed and spillage from the ends may also be reduced by vertical triangular end surfaces 33. From the position represented by blade 12 to that of blade $12^1$, the efficiency averages considerably above fifty per cent. of the maximum possible efficiency of the blade, as is also true of the travel from the position represented by blade $12^2$ to that of blade $12^3$. From the position of $12^3$ to that of 12 the vanes in the 90° arc therebetween are necessarily idle.

In Figure 1 it will be observed that the vanes 31 and 32 of the impeller blades are set at a slight angle to the axis of the machine. The purpose of this is to give the vanes an inherent tendency to close after they have swung into the vertical position, by virtue of their being carried through the air, their position being such that with respect to the plane of rotation of the impeller there is present an angle of incidence or attack, to the air through which they are being carried horizontally and which causes them to be swung transversely and caused to approach towards the plane of the blade surfaces C and D. By this means the danger of the vanes falling into a state of neutral equilibrium and not being caused to return to their working positions in which they act on the air to produce useful lift and thrust, is practically avoided. However, it is preferable to provide, as shown in Figures 5 and 6, spacing rods 34 tying all the vanes of a common surface together and which rod engages a portion of the blade frame 30 at a point 35 to prevent the vanes from swinging quite into the vertical positions thereby avoiding a tendency for them to fall into a state of neutral equilibrium with respect to the air pressures acting on them, and which, as above mentioned, might interfere with their proper closing.

In Figure 7 there is illustrated in cross section a modified form of impeller blade in which the inverted trough frame has three vane-carrying surfaces instead of two as in the form previously described, the three rows of vanes being shown as 37, 38 and 39. Such a modified blade construction is probably slightly more efficient than the two-sided trough form but has 50% more parts and is correspondingly more expensive to build. Obviously for the sake of efficiency the number of rows of surface elements comprising the trough-like impeller blades may be increased until the surface of the trough closely approximates the cambered surface of the usual airplane wing, although this construction is not preferred because of its costliness.

In Figure 4 the impeller blades 12, $12^1$, $12^2$ and $12^3$ are shown adjusted to a position in which they form a very considerable angle with the horizontal. With the blades adjusted to the position shown, the effect of their rotation in their substantially circular orbit about the center 13 is to produce, in addition to a vertical lift, a horizontal component of force which tends to propel the machine forwardly in the direction of the arrow. When the four impellers of the machine are caused to rotate by the engine, the machine is being lifted by the vertical force due to the downward travel of the blades through the course of their effective rotation, and at the same time it may be said to be gliding forward on the said surfaces. As adjusted in Figure 4, these surfaces provide lifting areas inclined to the horizontal, which, if the impellers were stationary, would provide sufficient surface to permit the machine to glide at high speed in the course of a gliding descent.

In the case where power is applied to the impellers, the necessary loss of altitude through such pure gliding action is overcome and the body of the machine is caused to maintain a constant altitude or even to ascend, while at the same time the machine may be said to be gliding forward and at a rate of speed greatly in excess of the rotational speed of the impeller blades. This may be better understood if the gliding flight of an ordinary airplane is considered. The motor of an airplane may be stopped, and by suitably inclining the axis of the machine to the horizontal, the airplane, if it has sufficient altitude, may be caused to fly at a high rate of speed and for long distances without any propulsive force whatever other than the action of gravity in producing what is recognized as gliding flight. It is this principle which is availed of to produce the horizontal travel of the present machine, and as already pointed out, permits it to travel forward at relatively high speeds and at a constant altitude when the motor is running, and which also, when the motor is shut off, permits the machine to continue its flight by gliding downwardly and gradually losing altitude. Furthermore, while so gliding, the machine can be maneuvered and landed in the same way as the usual type of airplane does at present.

The blade 12 in Figure 4 is shown in dotted lines in various positions which it may be caused to assume by the action of the feathering control eccentric 14. In these various positions the machine may be caused to rise vertically or to perform any desired combination of vertical and horizontal motion within its speed limits. When adjusted to the extreme counter-clockwise position illustrated, the blades will exert a considerable thrust in a direction opposite to that indicated by the arrow in Figure 4. A capacity to produce thrust in this direction may be useful in retarding the forward flight of the machine or causing it to hover over a given point on the ground when the wind is blowing from the rear of the machine, with the consequent tendency to cause it to drift forward. By inclining the impeller blades of both the forward and rear impellers parallel to a common plane, the thrust produced by forward impellers A, A' and rear impellers B, B' will both be in the same direction in spite of the fact that these two pairs of impellers are rotated in opposite directions. This fact permits of the use of rotary impellers of the present type to produce useful horizontal and vertical forces, but without any resultant torque whatsoever due to the rotation of the said impellers because of the fact that any number may be arranged in symmetrical oppositely rotated pairs whereby their resultant torques are neutralized. Each is rotated about an axis transverse to the line of flight of the machine whereby their horizontal components may be added together to produce useful flying thrusts without resultant torque, and thus dispensing with auxiliary horizontal propelling means heretofore resorted to for the purpose of maintaining horizontal flight in a machine capable also of rising vertically.

According to the present invention there is provided means for individually controlling the inclinations of the vanes of the four impellers each independently of the others so that the vertical and horizontal components of force of each impeller may be varied at will, whereby the machine may be stabilized both laterally and longitudinally and also turned in a horizontal plane to the right or left by the appropriate relative adjustment of the several impellers. For example, if the nose of the machine is lower than the tail, and the pilot desires to right it, the lifting efficiency of the forward impellers A, A' may be increased or the lift of the rear impellers B, B' diminished. If the machine is tipped to the left, the lifting efficiency of the impellers A', B' may be increased or the efficiency of impellers A, B diminished, and the machine will be laterally stabilized to the desired horizontal position. If it is desired to cause the machine to travel in a circle or even to practically pivot about its own center without any horizontal flight whatever, the lifting efficiencies of the impellers A, B may be maintained equal to that of the rotors A', B', but the horizontal components of the right and left hand impellers may be oppositely directed, A and B producing a forward thrust and A', B' producing a rearward thrust. This will create a force couple tending to revolve the machine in a clockwise direction. Obviously the reverse adjustment of the right and left hand impellers will cause the machine to turn in a counter-clockwise direction.

The same adjustments above described may be made use of to control the free gliding flight of the machine when the motor is not running, the impellers in fact constituting four lifting surfaces of an airplane, the incidence of each of which may be varied independently of the others. However, when a horizontally flying speed of over forty miles per hour is attained, the control of the stability and direction of flight may be accomplished without interfering with the lifting or propelling efficiency of the impellers by the use of the usual control surfaces, namely, ailerons, elevator and rudder. Ailerons 40 may be carried, as shown, extending outwardly from the transverse supporting frame 2. The elevator and rudder 41 and 42 respectively are mounted at the rear of the machine in accordance with standard airplane practice, a stabilizing plane 43 completing the surface formed by the elevator 41 into a tail plane contiguous with the fuselage of the machine.

Through the individual control of the impellers as above set forth, an adjustment may be obtained by which practically automatic longitudinal stability may be achieved when the machine is rising vertically. This is accomplished by setting the blades of the forward impellers to form a slightly positive angle of incidence with respect to the longitudinal axis of the machine, and the blades of the rear impellers with a slightly negative angle of incidence thereto. Because of the dihedral angle between the forward and rear surfaces, automatic longitudinal stability is obtained in the same way as it is achieved in airplane design by making the incidence of the rear stabilizer plane slightly less than that of the main lifting surfaces. With such an arrangement, when the machine tilts forward the front surfaces become more efficient than the rear surface, and consequently, the machine tends to right itself.

The machine may be driven by any suitable source of power, the power unit or units being preferably situated within the fuselage of the machine and so disposed with respect to the center of lift of the combined blade surfaces of the several impellers that the center of gravity of the machine will substantially coincide therewith.

The running gear of the machine may comprise forward and rear main wheels mounted, as shown, in suitable frames 45 and 46 respectively, the forward wheel frame being rotatable about a vertical axis and susceptible of directional control by any suitable steering mechanism. The rear wheel frame 46 is preferably swivel hung, the pivotal point being somewhat ahead of the wheel axle, as shown at 47. Balancing wheels 48 and 49 may be conveniently mounted in forks rigidly connected to the longitudinal truss members 3 and at an elevation somewhat above the plane of the main wheels so that the major landing stress will be normally received by said wheels. The wheels are preferably each provided with suitable shock-absorbing mountings in accordance with usual airplane practice.

While only a single embodiment of the invention has been illustrated and described, it is to be understood that the scope of the invention is not limited thereto and that it may be variously modified without departing from the spirit of the invention. The number and arrangement of the several rotary impellers is not material, the important aspect of the impeller arrangement being only that whatever the number employed they are to be arranged in oppositely rotated pairs with the axes of rotation substantially at right angles to the horizontal line of flght of the machine. The system of impellers hereinabove described is furthermore applicable to the propulsion of lighter than air machines and also as a means of marine propulsion. By suitable adaptation, the impellers may be used in any fluid medium whatsoever.

In the specification and claims it is to be understood that the expression "trough-like surfaces" applied to the impeller blades is intended to convey merely the idea of the surface being concave in the same sense that the airplane wing is said to be concave on its under side, it being not in any way essential that vertical end surfaces be provided to close the ends of the trough-like surfaces.

What I claim is:

1. A vertically rising airplane including oppositely rotating frames revolving about axes substantially transverse to the horizontal line of flight of the machine, and aerofoils carried thereby through substantially circular orbits, said aerofoils comprising inverted, trough-like surfaces, said trough-like surfaces being disposed with their valleys substantially parallel to the axes of rotation of the frames, and each of said surfaces being formed of a plurality of feathering shutter vanes.

2. A vertically rising airplane including a rotating frame revolving about an axis transverse to the horizontal line of flight of the machine, aerofoils carried thereby through substantially circular orbits, said aerofoils comprising dihedral surfaces, the line of intersection of the two planes of said surfaces being substantially parallel to the axis of rotation of the frame, and each of said surfaces comprising a plurality of feathering shutter vanes, the vanes of one surface being operable independently of those of the other.

3. A vertically rising airplane including a rotating frame, aerofoil surfaces carried thereby through substantially circular orbits about an axis which is transverse to the horizontal line of flight of the airplane, said aerofoil surfaces being formed by a plurality of feathering vanes, the individual pivotal axes of said vanes being substantially parallel to the line of flight of said airplane.

4. A vertically rising airplane including substantially axially transverse, oppositely rotated fore and aft rotary frames, each frame carrying a plurality of aerofoil surfaces pivotally mounted thereon, mechanical feathering means for automatically regulating the fore and aft or longitudinal incidence of said surfaces while they are rotated with the frames, said surfaces comprising sets of longitudinally pivoted vanes adapted to be feathered by the variation in air reaction whereby their transverse inclination is automatically varied to effect an opening and closing shutter action.

5. A vertically rising airplane including substantially axially transverse, oppositely rotated, fore and aft rotary frames, aerofoil surfaces pivotally mounted thereon and feathering means adapted to maintain the operative surfaces of said fore and aft frames substantially parallel to a chosen plane oblique to the horizontal throughout the rotation of said frames, whereby the airplane will be propelled in the same direction by the surfaces of both fore and aft rotary frames.

6. A rotary propelling device adapted for use in a fluid medium, said device including a rotary frame, propelling surfaces pivotally mounted thereon, said surfaces including a plurality of shutter vanes the pivotal axes of which are substantially at right angles to the axis of said rotary frame, and eccentric means adapted to maintain said surfaces parallel to a chosen plane throughout the rotation of said frame.

7. A rotary propelling device according to claim 6, further characterized in that stop means are provided to prevent at any time the said shutters from opening quite to dead center with respect to fluid pressures normally tending to close them.

8. A vertically rising airplane comprising a fuselage, fore and aft pairs of coaxial, transverse rotary frames, each pair being medially supported by said fuselage, each frame carrying a plurality of aerofoil surfaces, feathering means for said surfaces, a transverse supporting structure extending outwardly on either side of the fuselage and between said fore and aft rotary frames, at least one horizontal surface of said structure being covered to form a stationary lift area, each outer portion of said transverse supporting structure carrying longitudinal truss members which support the outer bearings of said fore and aft rotary frames.

9. A vertically rising airplane, said airplane including inverted trough-like aerofoils the active surfaces of which consist of shutter vanes, said aerofoils being disposed with their long axes substantially at right angles to the longitudinal axis of the machine, aerofoil actuating means adapted to continuously move certain of said aerofoils in oppposite directions over closed orbits, the planes of which orbits are substantially parallel to the longitudinal axis of the machine, and mechanical feathering means adapted to maintain said aerofoils parallel to a common plane throughout their orbital movements.

10. A vertically rising airplane including a plurality of rotating frames, and aerofoils the active surfaces of which consist of shutter vanes, said aerofoils being moved by said frames through closed orbits, the planes of said orbits being substantially parallel to the longitudinal axis of the airplane, one half of said aerofoils being moved in one direction through said orbits, the other half of said aerofoils being moved in the opposite direction through said orbits, and feathering means adapted to incline the aerofoils moving in both directions through said orbits, to substantial parallelism with a common plane which is oblique to the horizontal, whereby a common propulsive thrust is obtained from the aerofoils of said frames.

11. A propelling device including a frame, means for moving said frame about a closed orbit, said frame carrying two series of feathering vanes, the vanes of one series forming with relation to the vanes of the other series a dihedral angle such that the angle of incidence of one series relative to the orbital movement differs from that of the other, the vanes forming when closed a trough-like aerofoil the valley of which is transverse to the plane of orbital movement.

12. A propelling device for use in air, said device including a rotatable frame, vane-supporting frames pivotally mounted on said rotatable frame, mechanical feathering means adapted to maintain said vane-supporting frames substantially parallel to a common fixed plane, and at least two series of pivoted vanes carried by each of said supporting frames and adapted to be automatically feathered by air reaction, the vanes of one series being disposed so as to form a dihedral angle in the plane of rotation of said frames, with respect to the vanes of the other series, whereby the vanes of one series will have a different angle of air attack from the vanes of the other series and will therefore open and close at different times.

In witness whereof, I have hereunto signed my name.

AXEL G. BERGMAN.